United States Patent [19]

Andreas

[11] Patent Number: 4,843,509
[45] Date of Patent: Jun. 27, 1989

[54] APPARATUS FOR DEMAGNETIZING THE MAGNETIC HEAD OF A CASSETTE TAPE RECORDING AND/OR REPRODUCING DEVICE

[75] Inventor: Sam Andreas, Conshohocken, Pa.

[73] Assignee: Recoton Corporation, Long Island City, N.Y.

[21] Appl. No.: 152,915

[22] Filed: Feb. 5, 1988

[51] Int. Cl.[4] ............................................. G11B 5/465
[52] U.S. Cl. .................................................... 360/128
[58] Field of Search ................................ 360/128, 137

[56] References Cited

U.S. PATENT DOCUMENTS

| | | | |
|---|---|---|---|
| 3,647,990 | 3/1972 | Eul, Jr. et al. | 360/128 |
| 3,810,230 | 5/1974 | Orlowski et al. | 360/128 |
| 4,135,219 | 1/1979 | Yoshizawa et al. | 360/128 |
| 4,183,070 | 1/1980 | Fujita | 360/128 |
| 4,224,649 | 9/1980 | Alexandrovich, Sr. | 360/128 |
| 4,378,582 | 3/1983 | Maier et al. | 360/128 |

FOREIGN PATENT DOCUMENTS

| | | | |
|---|---|---|---|
| 0114115 | 7/1984 | European Pat. Off. | 360/128 |
| 55-4709 | 1/1980 | Japan | 360/128 |
| 57-191826 | 11/1982 | Japan | 360/128 |

Primary Examiner—John H. Wolff
Assistant Examiner—Matthew J. Bussan
Attorney, Agent, or Firm—Curtis, Morris & Safford

[57] ABSTRACT

A simple and inexpensive demagnetizer for the magnetic heads of a tape cassette recording and/or reproducing device includes an intermediate gear which is rotated by either one of two hub gears engaging respective drive spindles of the recording and/or reproducing device. A push-pull rod has one end pivotally connected to an outer radial position of the intermediate gear and another end pivotally connected to a source of alternating magnetic field of constant intensity. Rotation of the intermediate gear causes the magnetic field generator to be cylically and linearly reciprocated with respect to the head so as to produce a decreasing magnetic field at the head.

18 Claims, 2 Drawing Sheets

APPARATUS FOR DEMAGNETIZING THE MAGNETIC HEAD OF A CASSETTE TAPE RECORDING AND/OR REPRODUCING DEVICE

FIELD OF THE INVENTION

The present invention relates to apparatus for demagnetizing a magnetic head of a cassette tape recording and/or reproducing device and in particular relates to cassette-shaped demagnetizing apparatus which may be inserted in a recording and/or reproducing device for demagnetizing one or more of the magnetic heads thereof.

BACKGROUND OF THE INVENTION

In a conventional cassette tape recording and/or reproducing device, signals are recorded on and reproduced from a magnetic tape held within a cassette which placed in or on a cassette holder of the device. The cassette holder is frequently a tape receiving recess and the device includes a tape transport system having two reel drive spindles which project into the recess. The cassette correspondingly incorporates a take-up hub and a supply hub adapted to receive respective ones of the drive spindles. The drive spindles may be rotated either clockwise or counter-clockwise to rotate the hubs and thereby effect transfer of the tape from one hub to the other depending on the direction of rotation.

The recording and reproducing of signals on the tape within the cassette is carried out by means of magnetic heads whose construction is well known. The magnetic heads, which may include record heads, reproduce heads, erase heads and the like, are mounted within the device at operative positions relative to the cassette holder and drive spindles, and the cassette has defined portions in a side wall with openings into which the respective magnetic heads extend to contact the tape when the cassette is in the cassette holder for recording and reproducing signals. All such magnetic heads acquire residual magnetism over a period of time, and unless they are demagnetized (degaussed), the residual magnetism will cause noise and distortion during recording and/or during playback.

It is well known that the application of an alternating magnetic field having flux peaks of decreasing magnitude is effective to demagnetize the heads. This type of magnetic field, although periodically varying in intensity, will be referred to in this application as a decreasing magnetic field. An alternating magnetic field having flux peaks of constant magnitude will be referred to herein as a constant magnetic field, although in actuality it is constant neither in intensity or polarity.

Various head demagnetizers for providing a decreasing magnetic field have been proposed which are constructed in a cassette-shaped housing and are adapted to be positioned in the recording and/or reproducing device in place of a tape cassette. These demagnetizers have utilized the driving power from the spindles to produce the decreasing magnetic field. One way this is done is to fix a magnetic field generator within the housing at the wall portion adjacent each operative position, thus also a "demagnetizing" position, and to electronically decrease the magnetic field, for example by discharging a capacitor. Another way is to use the drive spindles to rotate a permanent magnet and so produce the alternating magnetic field and to mechanically withdraw the rotating magnet from the demagnetizing position. Such prior art demagnetizers have tended to be relatively complicated in construction, either electrically or mechanically. Since a cassette demagnetizer is intended to be relatively inexpensive, useful over a long period of time and operated by unsophisticated consumers, it would be highly advantageous for it to have a minimum number of parts, mechanical or electrical. Such a demagnetizer, however, must still achieve a sufficient relative decrease in the magnetic field to produce the desired demagnetizing effect.

OBJECTS AND SUMMARY OF THE INVENTION

It is an object of the present invention to provide apparatus for demagnetizing a magnetic head of a cassette tape recording and/or reproducing device which avoids the above-described difficulties of the prior art.

It is a further object of the present invention to provide apparatus for demagnetizing a magnetic head of a cassette tape recording and/or reproducing device which is inexpensive, simple in construction and contains a minimum of parts, mechanical or electrical.

It is yet a further object of the present invention to provide apparatus for demagnetizing a magnetic head of a cassette tape recording and/or reproducing device which simplifies the generation of a decreasing magnetic field.

It is still a further object of the present invention to provide such apparatus which maximizes the demagnetizing effect of the generated magnetic field.

In accordance with an aspect of the present invention, apparatus for demagnetizing a magnetic head of a cassette tape recording and/or reproducing device of the type having a tape holding means capable of holding a cassette in predetermined relation to the head when the head is at an operative position, and tape transport means including first and second spaced reel drive spindles comprises a cassette-shaped housing adapted to be held by the holding means and having a portion of a wall adjacent the head at the operative position when the housing is held by the holding means, hub gear means rotatably mounted in the housing and adapted to be driven in rotation by at least one of the drive spindles, electromagnet means for producing an alternating magnetic field having flux peaks of constant magnitude and positionable at the wall portion, and mechanical coupling means for coupling said electromagnet means to said hub gear means so that said electromagnet means is rectilinearly reciprocated with respect to said wall portion along a path within the housing substantially perpendicular to said wall portion in response to rotation of the hub gear means.

These and other objects, aspects and features of the present invention will become apparent from the following detailed description of a preferred embodiment of the present invention taken in connection with the accompanying drawings, throughout which like reference numerals denote like elements and parts.

DETAILED DESCRIPTION OF THE PREFERRED EMBODIMENT

Figure 1:
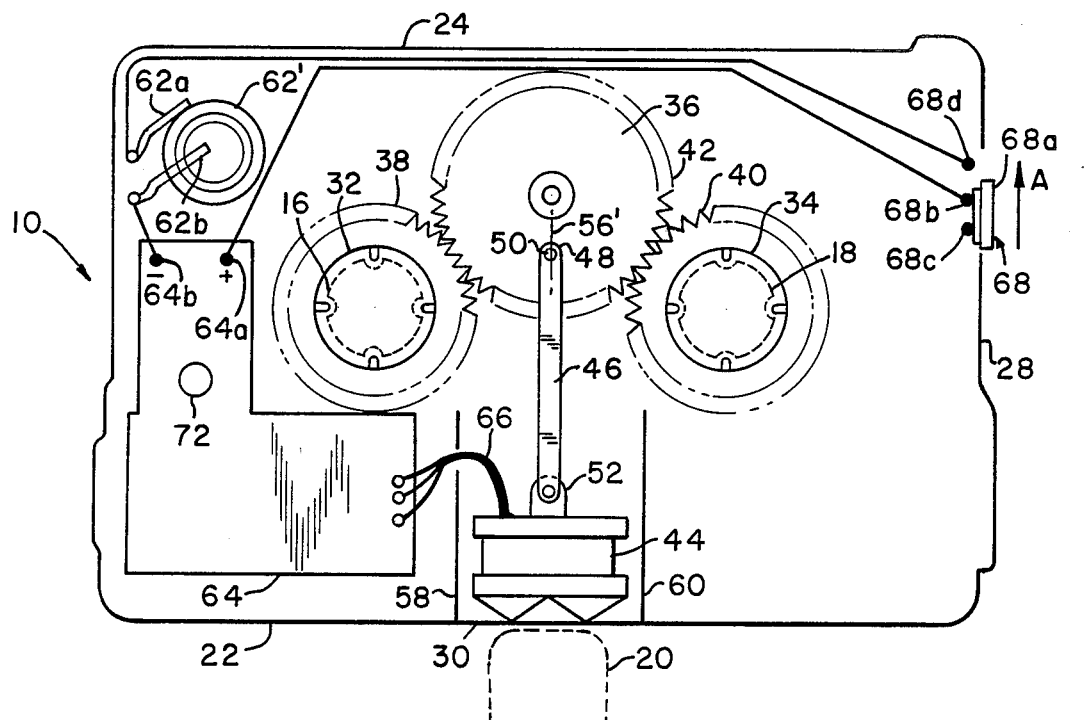
FIG. 1 is a top plan view of a preferred embodiment of the present invention, illustrating the apparatus with an electromagnet within the housing adjacent a magnetic head of cassette tape recording and/or reproducing device.

Referring now to the drawings and initially to FIG. 1 thereof, a preferred embodiment of the present invention is constructed in a cassette-shaped housing 10 and may be considered disposed within a cassette holder or recess 12 of a cassette tape recording and/or reproducing device 14 (not illustrated) in precisely the same manner as a conventional tape cassette may be disposed in recess 12. The device 14 is of standard design and includes take-up and supply reel drive spindles 16, 18 (shown in phantom) extending perpendicularly into recess 12. Also positioned within recess 12 is a record/playback head 20, (also shown schematically in phantom). The present description will be given with respect to a device 14 which includes a single head 20. Other such devices include a number of heads 20 and it will be apparent to one skilled in the art that the present invention encompasses a demagnetizing apparatus suitable or use in such devices for demagnetizing one, some or all heads 20 therein.

Housing 10 has a generally rectangular cross section with opposed front and back walls 22, 24, opposed left and right side walls 26, 28 and top and bottom walls (not illustrated). A wall portion 30 of front wall 22 is adjacent an operative position which head 20 assumes when device 14 is activated. Wall portion 30 in a conventional tape cassette would contain an opening through which at the operative position head 20 extends to contact the tape within so as to record and/or playback signals therefrom. In the apparatus according to the present invention, wall portion 30 may have such an opening and defines a demagnetizing position adjacent head 20 at which a source of alternating magnetic field is positionable so that head 20 may be demagnetized by the removal of any residual accumulation of magnetism.

In place of the conventional take-up and supply wheels of a tape cassette, housing 10 includes first and second rotatably mounted hub gears 32, 34 which are adapted to engage respective ones of spindles 16, 18 of device 14 when housing 10 is inserted in recess 12. Each hub gear 32, 34 may be rotated in a selected one of clockwise and counter-clockwise directions by rotation of the respective spindles 16, 18 corresponding to forward and reverse feeding of the tape in a tape cassette.

A circular, intermediate gear 36 positioned between the first and second hub gears 32, 34 is rotatably mounted to be driven by either of the hub gears 32, 34. To this end, first and second hub gears 32, 34 have respective outer toothed peripheries 38, 40 and intermediate gear 36 has a third outer toothed periphery 42 which meshingly engages first and second toothed peripheries 38, 40 of first and second hub gears 32, 34 respectively. Thus, rotation of either first or second hub gear 32, 34 in a selected direction, clockwise or counter-clockwise, will cause intermediate gear 36 to rotate in opposition thereto, that is, counter-clockwise or clockwise. In accordance with the present invention, it is irrelevant whether intermediate gear 36 is rotated clockwise or counter-clockwise in order to achieve the demagnetizing effect. Consequently, either the forward or reverse play buttons on device 14 may be actuated for demagnetization, which reduces the chance of misoperation.

A magnetic field producer in the form of an electromagnet 44 is positionable at wall portion 30 in front wall 22. The magnetic field produced by electromagnet 44 is an alternating magnetic field having flux peaks of constant magnitude. Although some variation in the magnitude of the flux peaks may occur due to noise, for example, it is contemplated that the change in magnitude is not on the order of that needed to demagnetize head 20. Electromagnet 44 is connected to an advantageous magnetic field generating circuit, discussed below.

Figure 2:
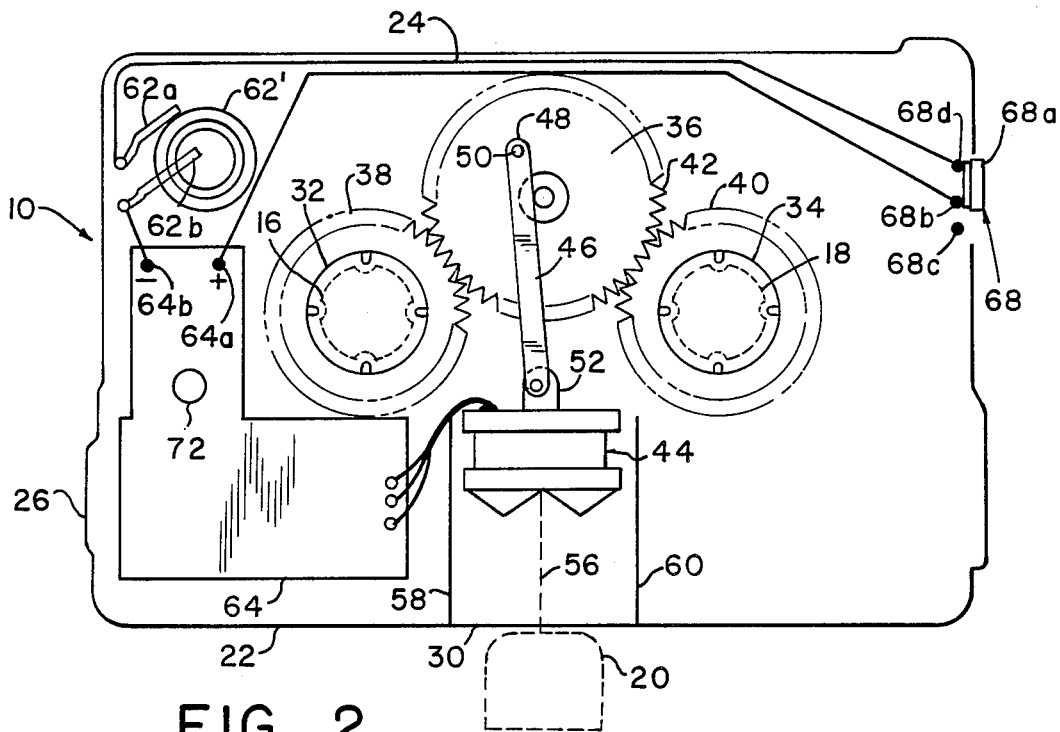
FIG. 2 is a top plan view of the embodiment of FIG. 1, illustrating the electromagnet at a position withdrawn from the magnetic head.

A push-pull rod 46 has one end 48 pivotally connected to intermediate gear 36 at an outer radial position 50 thereon. Push-pull rod has a second end 52 pivotally connected to electromagnet 44. Push-pull rod 46 has a length and radial position 50 on intermediate gear 36 has such a distance from the center of intermediate gear 36 that when radial position 50 reaches its closest approach to wall portion 30, as illustrated in FIG. 1, electromagnet 44 will have been pushed by end 52 to be directly adjacent wall portion 30. However, as intermediate gear 36 is rotated by either hub gear 32, 34 to move radial position 50 away from wall portion 30, electromagnet 44 is cyclically withdrawn a significant distance from wall portion 30, as illustrated in FIG. 2, and then returned thereto. Consequently, although the alternating magnetic field produced by electromagnet 44 is maintained at a constant magnitude, the magnitude of the magnetic field at wall portion 30 itself is cyclically decreased and increased to produce the desired demagnetizing effect on head 20. In order to maximize the relative change in magnetic field for the stroke produced by intermediate gear 36 and push-pull rod 46, the motion of electromagnet 44 away from and towards wall portion 30 is limited to rectilinear reciprocation along a substantially linear path 56 (FIG. 2) with housing 10 perpendicular to wall 22 by guide means advantageously in the form of interior walls 58, 60 extending upwardly and molded integrally with the bottom wall of housing 10. In the preferred embodiment, intermediate gear 36 is mounted for rotation about a point lying on an extension 56' (FIG. 1) of path 56, shown in a dashed line, so that electromagnet 44 naturally tends to move along path 56. It will be understood that in apparatus such as in the present invention a degree of tolerance is permitted in the relative dimensions of intermediate gear 36, electromagnet 44, push-pull rod 46 and walls 58, 60, so that path 56 need not necessarily be perfectly linear or perfectly perpendicular to wall 22, nor need electromagnet 44 be perfectly centered at wall portion 30 or fully positioned thereat. A small amount of play will reduce manufacturing and assembly costs, an advantageous feature in a product of this type, but the motion of electromagnet 44 will still be substantially rectilinear.

As mentioned above, electromagnet 44 produces an alternating magnetic field having flux peaks of constant magnitude and the decreasing magnitude effect is achieved by cyclically withdrawing electromagnet 44 away from and back towards wall portion 30. Housing 10 also includes a DC power supply in the form of a 1.5 volt battery 62 and an advantageous circuit 64 for producing the alternating magnetic field of constant magnitude. Battery 62 and circuit 64 are fixedly mounted in housing 10, and circuit 64 provides a pulse signal to electromagnet 44 through a flexible wire connection 66 in order to create the magnetic field of constant magnitude in accordance with known principles. Flexible connection 66 permits the reciprocating motion of electromagnet 44 away from and towards wall portion 30 as described above.

When it is desired to begin producing the magnetic field, as when housing 10 is about to be inserted into device 14, battery 62 is connected to circuit 64 by means of a switch 68. Switch 68 is advantageously as simple as possible and, in the preferred embodiment, consists merely of a sliding contact 68a which in the off or open position (FIG. 1) connects the positive power terminal 64a of circuit 64 through switch terminal 68b to a ground terminal 68c. Contact 68a may be moved in the direction of arrow A of FIG. 1 to the on or closed position (FIG. 2) wherein contact 68a connects switch terminals 68b to switch terminal 68d, which in turn is connected to the positive terminal 62a of battery 62. The negative terminals 62b, 64b of battery 62 and demagnetizing circuit 64, respectively, are permanently connected together.

Figure 3:
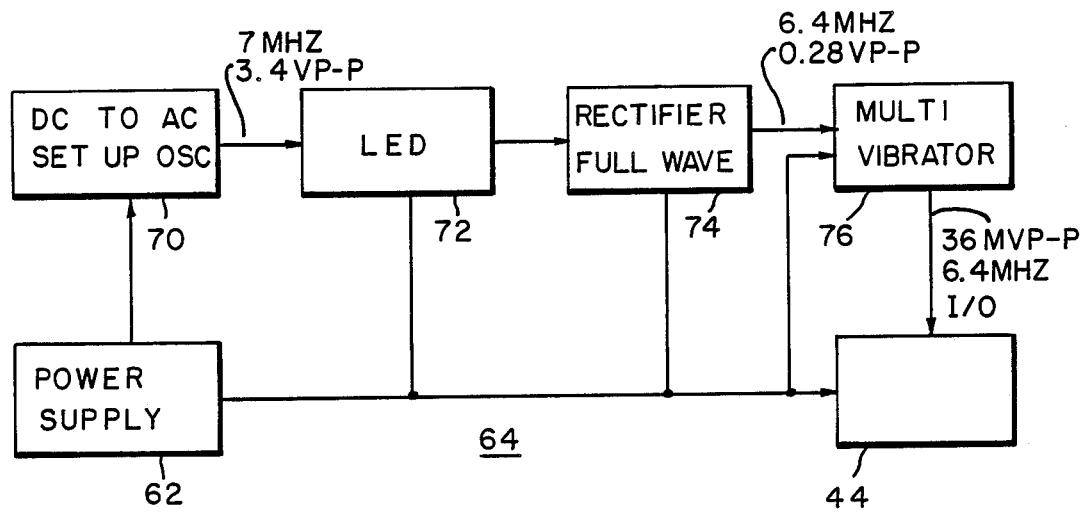
FIG. 3 is a schematic block diagram of a circuit for generating an alternating magnetic field of constant magnitude.
Figure 4:
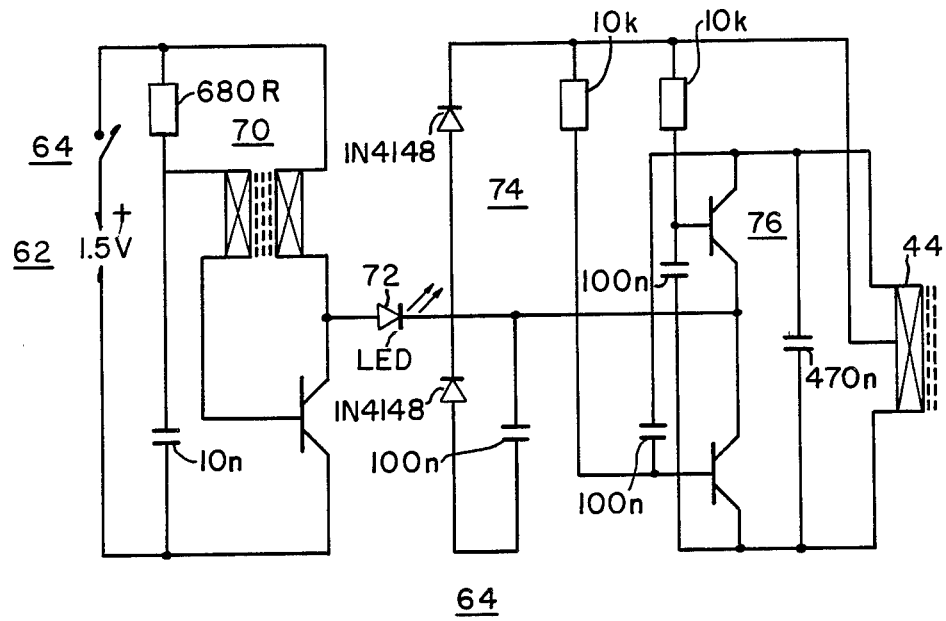
FIG. 4 is a circuit diagram of the circuit of FIG. 3.

Circuits for producing an alternating magnetic field of constant intensity are of course well known in the art. Circuit 64 is a particularly advantageous example of such a circuit and is illustrated in FIGS. 3 and 4. Referring first to FIG. 3, when circuit 64 is turned on by manually sliding switch 68 to its on position (FIG. 2) to produce the magnetic field of constant intensity, battery 62 supplies power to all the elements in circuit 64. A DC-to-ac step-up oscillator 70 supplies a 7 MHz, 3.4 volt peak-to-peak ac signal through an indicator 72, advantageously in the form of a light emitting diode (LED), to a full wave rectifier 74. Rectifier 74 in turn provides a 6.4 MHz, 0.28 volt peak-to-peak signal to a multivibrator 76, which in turn provides a 6.4 MHz, 36 mV peak-to-peak pulse signal to electromagnet 44. Electromagnet 44 is responsive to the received pulse signal to produce the alternating magnetic field in accordance with known principles. LED 72 indicates that battery 62 is connected and that the magnetic field is being produced. It will be understood by those skilled in the art that these specifications, while providing an advantageous construction for circuit 64, may be considerably varied while still producing an appropriate magnetic field. Indeed, other circuits and magnetic field producers utilizing different types of elements may also be used provided the magnetic field generated thereby has a substantially constant magnitude.

FIG. 4 illustrates a circuit diagram for the circuit of FIG. 3, indicating an advantageous specification of circuit elements to produce the recited signals and functions.

The present invention has been described in connection with a preferred embodiment, but it will be apparent to one skilled in the art that many modifications and changes are possible without departing from the spirit or scope of the present invention. For example, while the preferred embodiment includes an intermediate gear which may be driven by either one of two hub gears, an alternative embodiment might include only a single hub gear or a different means for coupling the hub gear to the electromagnet. Therefore, the scope of the present invention should be determined by reference to the appended claims.

I claim:

1. Apparatus for demagnetizing a magnetic head of a cassette tape recording and/or reproducing device of the type having holding means capable of holding a cassette in predetermined relation to said head when said head is at an operative position, and tape transport means including first and second spaced reel drive spindles, the apparatus comprising:
    a cassette-shaped housing adapted to be held by said holding means and having a portion of a wall adjacent said head at said operative position when said housing is held by said holding means;
    hub members rotatably mounted in said housing and adapted to be driven in rotation by at least one of said drive spindles;
    electromagnet means including an electromagnet and operative electrical connection therefor for producing an alternating magnetic field having flux peaks of constant magnitude, said electromagnet means being positionable at said wall portion; and
    mechanical coupling means for coupling said electromagnet means to said hub members so that said electromagnet means is rectilinearly reciprocated with respect to said wall portion along a path within said housing substantially perpendicular to said wall portion in response to rotation of said hub members.

2. Apparatus according to claim 1, wherein said coupling means includes an intermediate rotatable member for engaging said hub members and aligned with said wall portion, and link means connecting said intermediate rotatable member with said electromagnet means to effect said rectilinear reciprocating movement of said electromagnet means with rotation of said intermediate rotatable member.

3. Apparatus according to claim 2, wherein said coupling means further includes guide means for limiting motion of said electromagnet means to said path.

4. Apparatus according to claim 2, wherein said link means includes push-pull rod means having a first end pivotally connected to said intermediate rotatable member at an outer radial position thereof and having a second end pivotally connected to said electromagnet means for cyclically withdrawing said electromagnet means from said wall portion and returning the same thereto.

5. Apparatus according to claim 2, wherein said hub members each include first and second peripheral gear portions and said coupling means being coupled to both said first and second hub members.

6. Apparatus according to claim 5, wherein said coupling means includes a peripheral gear portion for engaging both of said gear portions on said first and second hub members so as to be driven in rotation by rotation of either one of said first and second hub members.

7. Apparatus according to claim 1, further comprising means for generating an alternating magnetic field including battery means for generating DC power, DC-ac step-up oscillator means responsive to said DC power for generating an ac signal, rectifier means for rectifying said ac signal and producing a rectified output, and multivibrator means receiving said rectified output for providing a pulse signal to said electromagnet means, said electromagnet means producing said magnetic field in response to said pulse signal.

8. Apparatus according to claim 7, further comprising manually actuable on/off switch means for selectively connecting said battery means to said oscillator means.

9. Apparatus according to claim 8, further comprising indicator means responsive to actuation of said switch means to indicate connection of said battery means to said oscillator means.

10. Apparatus according to claim 8, wherein said electromagnet means receives said pulse signal from said multivibrator means by a flexible wire connection, said battery means, said oscillator means, said rectifier means and said multivibrator means being fixedly mounted in said housing and said flexible wire connection permitting said motion of said electromagnet means away from and towards said wall portion.

11. Apparatus for demagnetizing a magnetic head of a cassette tape recording and/or reproducing device of the type having a holding means capable of holding a cassette in predetermined relation to said head when said head is at an operative position, and tape transport means including first and second spaced reel drive spindles, the apparatus comprising:
- a cassette-shaped housing adapted to be held by said holding means and having a portion of a wall adjacent said head at said operative position when said housing is held by said holding means;
- first and second hub gears rotatably mounted in said housing and adapted to engage respective spindles of said device for rotation thereby;
- a circular, rotatable intermediate gear positioned between said first and second hub gears and meshingly engaging said first and second hub gears, whereby said intermediate gear is rotatable by rotation of either of said hub gears;
- means for generating an alternating magnetic field having flux peaks of constant magnitude and including an electromagnet at which said magnetic field is produced, said electromagnet being positionable at said wall portion;
- push-pull rod means having a first end pivotally connected to said intermediate gear at an outer radial position thereof and having a second end pivotally connected to said electromagnet for cyclically withdrawing said electromagnet from said wall portion and returning the same thereto; and
- guide means for limiting motion of said electromagnet away from and towards said wall portion to rectilinear reciprocation along a substantially linear path perpendicular thereto.

12. Apparatus according to claim 11, wherein said first and second hub gears are positioned symmetrically on either side of said path and wherein said intermediate gear rotates around a point lying on an extension of said path.

13. Apparatus according to claim 11, further comprising manually actuable on/off switch means for selectively actuating said means for generating an alternating magnetic field.

14. Apparatus according to claim 11, wherein said means for generating an alternating magnetic field includes battery means for generating DC power, DC-ac step-up oscillator means responsive to said DC power for generating an ac signal, rectifying means for rectifying said ac signal and producing a rectified output.

15. Apparatus according to claim 14, including multivibrator means receiving said rectified output for providing a pulse signal to said electromagnet, said electromagnet producing said magnetic field in response to said pulse signal.

16. Apparatus according to claim 14, further comprising manually actuable on/off switch means for selectively connecting said battery means to said oscillator means.

17. Apparatus according to claim 16, further comprising indicator means responsive to actuation of said switch means to indicate connection of said battery means to said oscillator means.

18. Apparatus according to claim 15, wherein said electromagnet receives said pulse signal from said multivibrator means by a flexible wire connection, said battery means, said oscillator means, said rectifier means and said multivibrator means being fixed mounted in said housing and said flexible wire connection permitting said motion of said electromagnet away from and towards sad wall portion.

* * * * *